(12) United States Patent
Brinker (10) Patent No.: US 7,748,739 B2
(45) Date of Patent: Jul. 6, 2010

(54) DEVICE FOR PROTECTING AN INFLATABLE ELEMENT

(75) Inventor: Kristy Brinker, Macomb, MI (US)

(73) Assignee: Autoliv ASP, Inc., Ogden, UT (US)

(*) Notice: Subject to any disclaimer, the term of this patent is extended or adjusted under 35 U.S.C. 154(b) by 922 days.

(21) Appl. No.: 11/475,795

(22) Filed: Jun. 27, 2006

(65) Prior Publication Data

US 2007/0296191 A1 Dec. 27, 2007

(51) Int. Cl.
*B60R 21/16* (2006.01)
(52) U.S. Cl. ................... 280/742; 280/743.1; 280/743.2
(58) Field of Classification Search ............. 280/728.2, 280/729, 736, 739, 743.1, 743.2, 742
See application file for complete search history.

(56) References Cited

U.S. PATENT DOCUMENTS

| | | | |
|---|---|---|---|
| 3,473,824 A | 10/1969 | Carey et al. | |
| 3,586,347 A | 6/1971 | Carey et al. | |
| 5,607,183 A * | 3/1997 | Nishimura et al. | 280/743.2 |
| 5,848,805 A * | 12/1998 | Sogi et al. | 280/743.2 |
| 6,209,911 B1 * | 4/2001 | Igawa et al. | 280/740 |
| 6,345,841 B2 * | 2/2002 | Igawa et al. | 280/740 |
| 6,361,067 B1 | 3/2002 | Varcus et al. | |
| 6,371,510 B1 * | 4/2002 | Marriott et al. | 280/730.1 |
| 6,598,903 B2 * | 7/2003 | Okada et al. | 280/743.2 |
| 6,676,158 B2 * | 1/2004 | Ishikawa | 280/743.1 |
| 7,152,875 B2 * | 12/2006 | Kai | 280/739 |
| 7,281,734 B2 * | 10/2007 | Abe et al. | 280/729 |
| 7,380,822 B2 * | 6/2008 | Abe | 280/743.1 |
| 7,458,607 B2 * | 12/2008 | Abe | 280/739 |
| 2002/0005639 A1 | 1/2002 | Varcus | |
| 2002/0033590 A1 | 3/2002 | Adkisson | |

FOREIGN PATENT DOCUMENTS

| | | |
|---|---|---|
| EP | 0496566 A1 | 7/1992 |
| EP | 835786 | 4/1998 |
| GB | 2265118 | 9/1993 |
| GB | 2265118 A | 9/1993 |
| JP | 10226294 | 8/1998 |

\* cited by examiner

*Primary Examiner*—Toan C To
(74) *Attorney, Agent, or Firm*—Sally J Brown; Madson IP, P.C.

(57) ABSTRACT

Various embodiments of the invention provide a device for protecting the cushion material of an inflatable element from inflator gases and particulate matter. The device along with an inflator and an airbag may be placed in a housing. The device includes a first strip and a second strip. Each of the first strip and second strip includes at least one opening. Each of the openings are surrounded by a plurality of holes. The second strip may be placed above the first strip in a suitable position.

13 Claims, 7 Drawing Sheets

DEVICE FOR PROTECTING AN INFLATABLE ELEMENT

BACKGROUND

The invention relates to automobiles. More specifically, the invention relates to a device for protecting an airbag cushion material from inflator gases.

An airbag module generally includes an airbag, an inflator, a retaining ring and a housing in which the aforementioned components are stored. The inflator activates by a crash sensor after a collision.

Currently, retaining rings are used in airbag modules to protect the airbag cushion material from the hot gases released from the inflator. Retaining rings retain the airbag in place upon inflation.

In addition to the retaining ring, pertain airbag modules also include diffusers which guide and diffuse the inflator gases into the airbag. The diffuser controls the flow of the inflator gases.

The airbag cushion may be adversely affected during inflation by high temperatures of the inflator gases. Furthermore, particulate matter ejected out of apertures of the inflator may also affect the airbag cushion. Lastly, the use of retaining rings and diffusers in the manufacturing process of the airbag module also increases overall costs as well as time.

SUMMARY

An object of the invention is to provide a device that protects cushion material of an inflatable element from gases and particulate matter coming out of an inflator.

Another object of the invention is to provide a diffuser for guiding the inflator gases to the inflatable element.

Various embodiments of the invention provide a device for protecting the cushion material of the inflatable element from the inflator gases and the particulate matter. The device along with an inflator and an airbag may be placed in a housing. The device includes a first strip and a second strip that is rectangular in shape. Each of the first strip and second strip include at least one opening. Each of the openings are surrounded by a plurality of holes. The second strip is placed above the first strip in a suitable position.

BRIEF DESCRIPTION OF THE DRAWINGS

The embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the invention provide a device, including a plurality of strips, to protect an inflatable element such as an airbag. Each of the plurality of strips includes an opening for placing an inflator. The device, along with the inflator and the airbag may be placed into a housing in an automobile.

Figure 1:
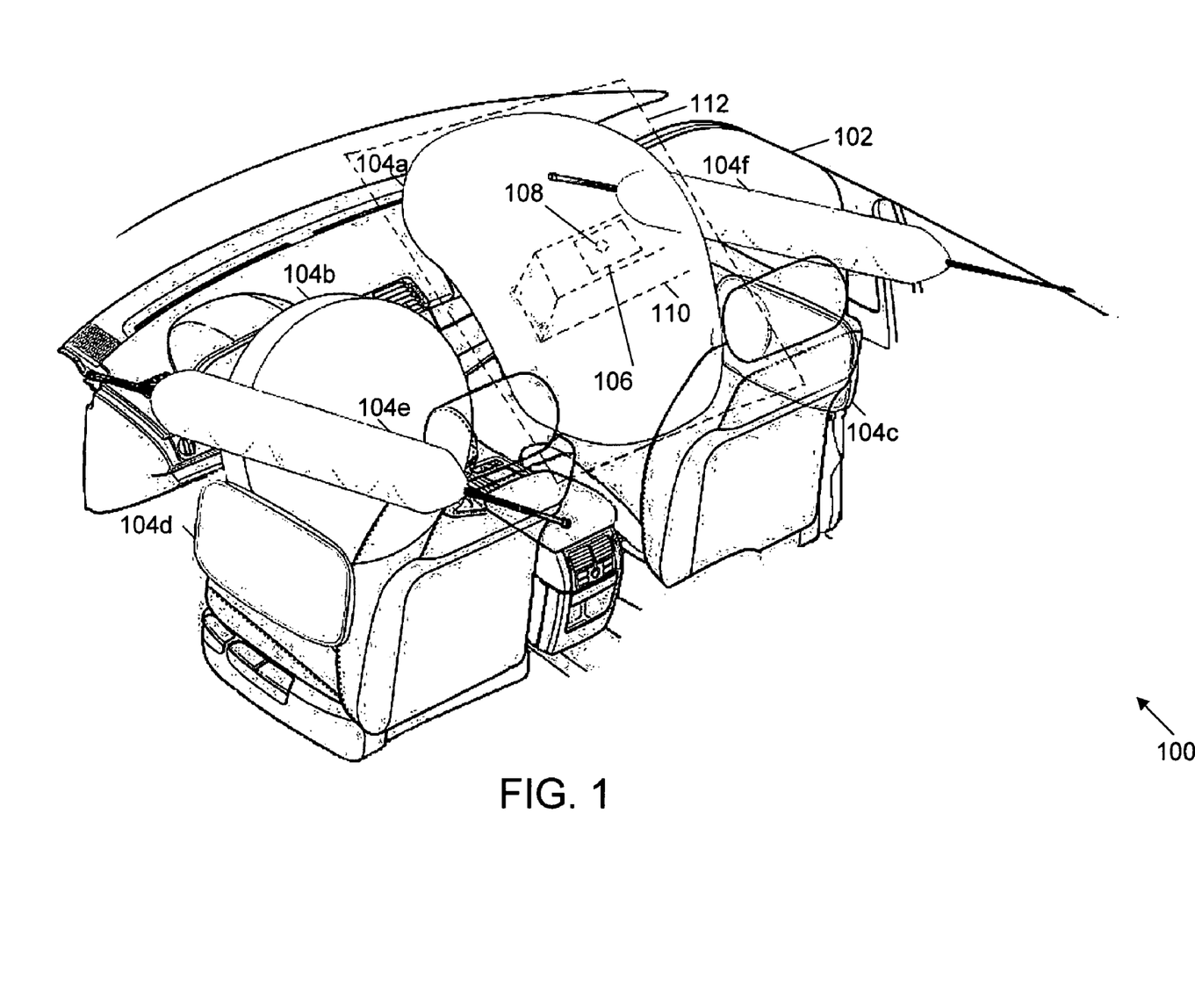
FIG. 1 shows an environment where various embodiments of the invention can be implemented.

FIG. 1 shows an environment 100 where various embodiments of the invention can be implemented. Environment 100 includes a perspective view of an automobile 102, a plurality of inflatable elements 104 including inflatable elements 104a to 104f, a device 106, an inflator 108, a housing 110 and an airbag module 112. Airbag module 112 includes inflatable element 104, device 106, inflator 108, and housing 110. Device 106 along with inflator 108 is placed inside inflatable element 104. Examples of inflatable element 104 include, but are not limited to, driver airbags, passenger airbags, side airbags and curtain airbags.

Figure 2:
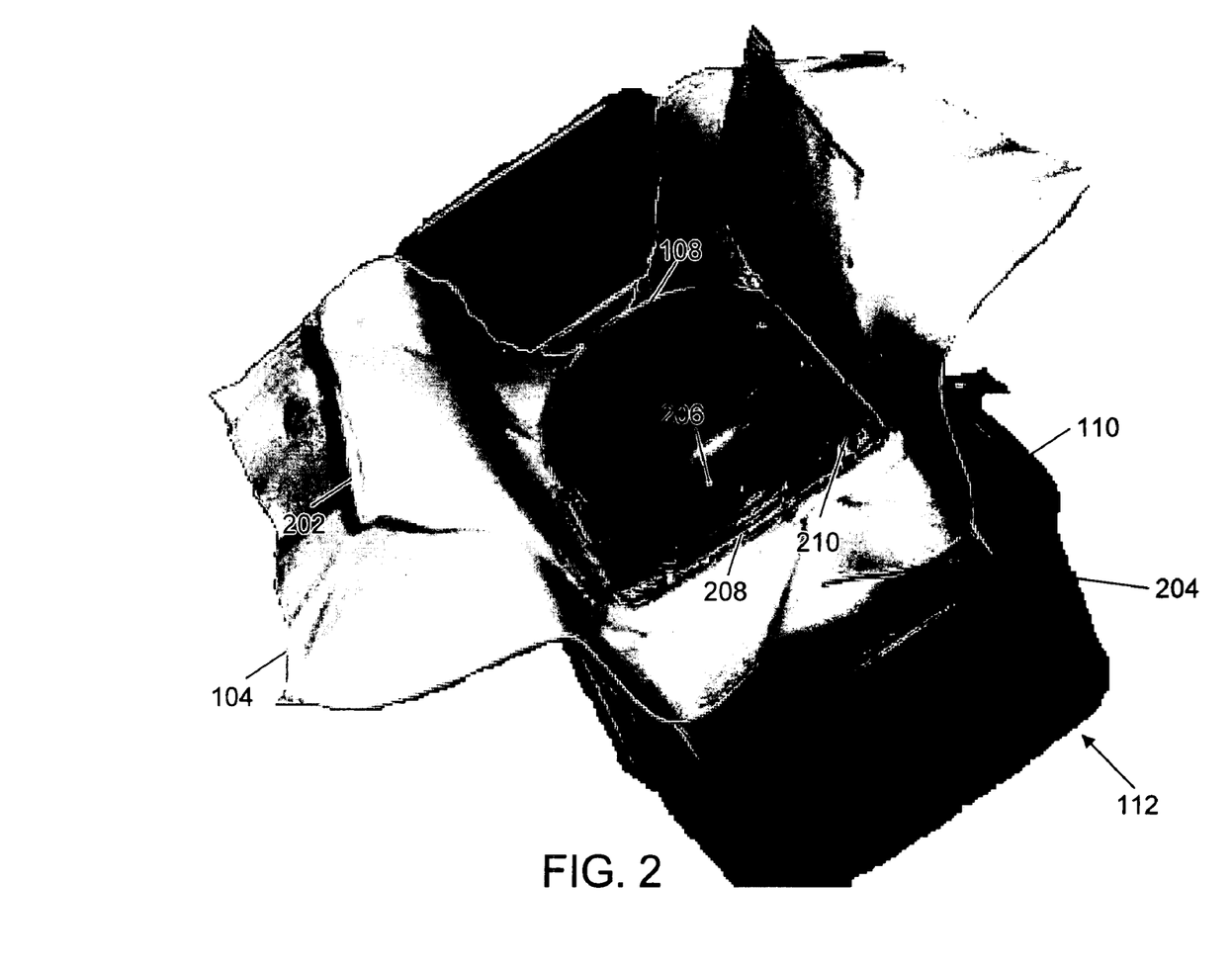
FIG. 2 shows a perspective view of an airbag module, in accordance with an embodiment of the invention.

FIG. 2 shows a perspective view of airbag module 112, in accordance with an embodiment of the invention. Airbag module 112 includes inflatable element 104, inflator 108, housing 110, a plurality of strips 202 and a supporting means 204. Inflator 108 includes a cylindrical portion with a plurality of apertures 206 circumferentially spaced about an outer surface. Inflator 108 includes a flange 208 that extends orthogonally outward from the outer surface. The plurality of strips 202 may hereinafter referred to as device 106. Furthermore, throughout this specification, unless the context requires otherwise, device 106 will be understood to imply the inclusion of strips 202. In another embodiment of the invention, the number of strips may vary according to the design requirements of inflator 108.

Device 106 is attached to inflator 108 through a plurality of attachable means. Examples of the attachable means include, but are not limited to studs, screws and nuts. In an embodiment of the invention, the attachable means include a plurality of studs 210.

Inflator 108 is placed inside supporting means 204. In an embodiment, supporting means 204 is a cubical metal body that allows inflator 108 to be in a rigid position. Strips 202 and inflatable element 104 are placed between flange 208 and supporting means 204. Inflator 108, strips 202, inflatable element 104 and supporting means 204 together are inserted in housing 110.

In an embodiment, inflator 108 includes an igniter (not shown) to ignite a gas generant on detecting a collision by a crash sensor (not shown). Inflator 108 pumps gases generated by the gas generant into inflatable element 104 to inflate it to an appropriate size. If flange 208 is suitably designed, it may help direct inflator gases axially outward increasing the speed and performance of inflation.

It may be noted that each strip in device 106 can be made individually. Further, the strips in device 106 may also be made from a single piece of fabric.

The throat design of inflatable element 104 and housing 110 would predominantly decide the design and the number of strips in device 106. The design and number of strips used in device 106 will also depend on the results of static testing of airbag module 112.

Strips 202 are attached to inflatable element 104 with the help of studs 210 present on inflator 108 which pass through holes 308 and hold the housing 110 and inflatable element 104 in a rigid position. In another embodiment, strips 202 may be attached to inflatable element 104 by sewing or gluing.

The number of studs 210 is dependent on the number of holes present on flange 208. Studs 210 are pressed into flange 208. Further, studs 210 align and rigidly hold strips 202, inflatable element 104, supporting means 204 and housing 110. Apertures 206 regulate and direct inflator gases into inflatable element 104. In addition to regulating inflator gases, apertures 206 also filter out larger particulate matter releasing out of inflator 108. In an embodiment of the invention, inflator 108 is cylindrical in shape.

Figure 3:
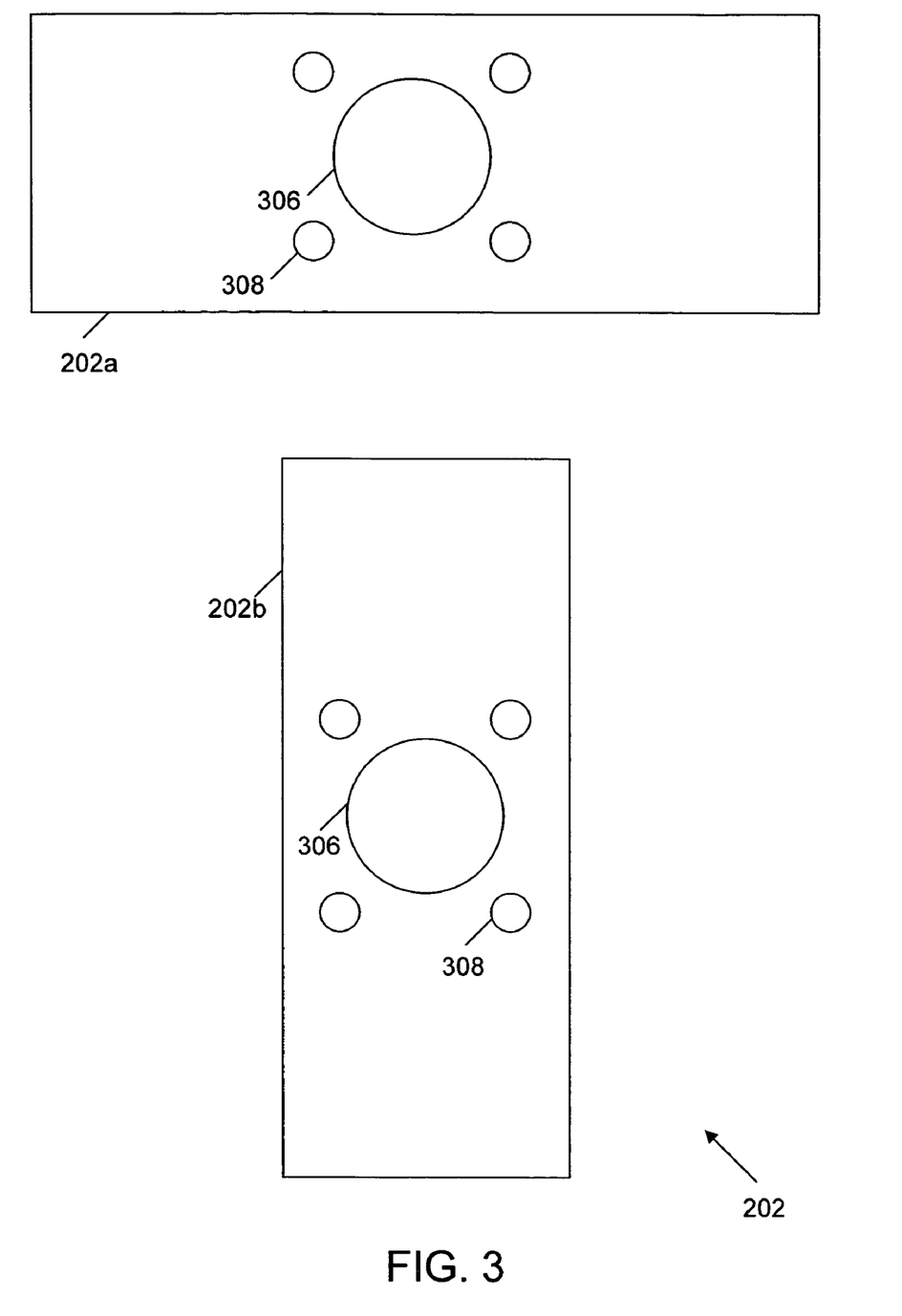
FIG. 3 shows the top view of a device in accordance with an embodiment of the invention.

FIG. 3 is a top view of device 106 in accordance with an embodiment of the invention. Strips 202 include a first strip 202a and a second strip 202b. Each of strips 202 include an opening 306 and a plurality of holes 308.

The shape of each strip 202 may be for example, a rectangle, a square, a rhombus, and so on. In an embodiment of the invention, the shape of strips 202 is rectangular. The rectangular shape allows strips 202 to offer maximum protection to inflatable element 104.

Opening 306 is cut in a suitable geometry that is dependent of the shape of inflator 108. In an embodiment of the invention, opening 306 is circular to accommodate inflator 108 that is cylindrical in shape. Further, opening 306 is surrounded by holes 308. Holes 308 may be altered based on number of studs 210 incorporated onto flange 208 of inflator 108. In an embodiment of the invention, four holes are used on strips 202.

Openings 306 are used for inserting inflator 108. In an embodiment of the invention, studs 210 present on flange 208 attach inflator 108, device 106 and throat of inflatable element 104 through holes 308

The fabric of strips 202 is coated with a coating material. In an embodiment of the invention, the coating material used is a heat resistant material. Examples of coating material include, but are not limited to 306d coated, 420d coated, neoprene, and so on.

Figure 4:
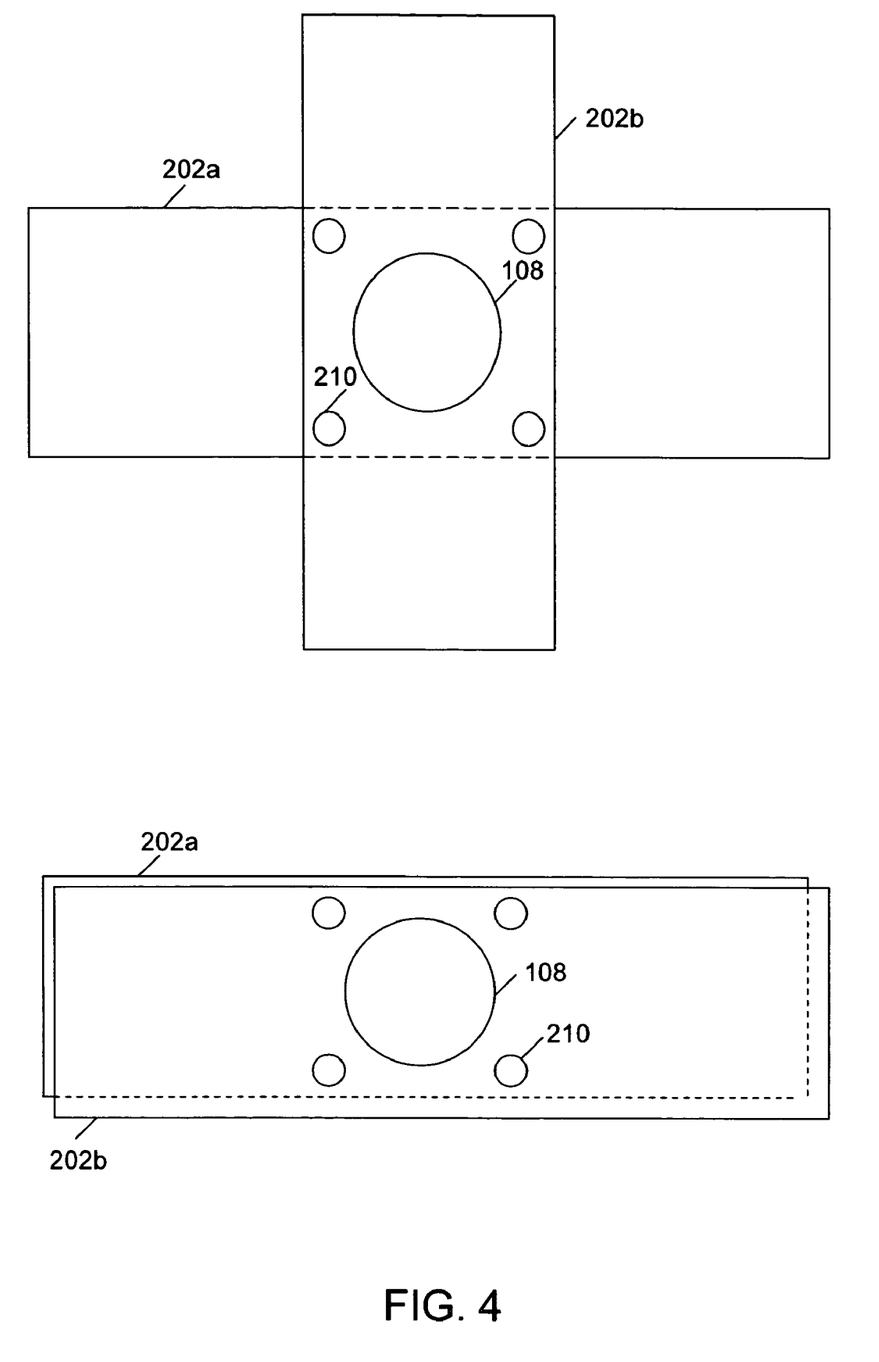
FIG. 4 is a top view of two arrangements of the device, in accordance with an embodiment of the invention.

FIG. 4 is a top view of two arrangements of device 106, in accordance with an embodiment of the invention.

In one embodiment, first strip 202a is placed below the second strip 202b and in a perpendicular position with respect to second strip 202b. First strip 202a and second strip 202b are aligned through studs 210 which pass through holes 308.

In another embodiment of the invention, strips 202 may be placed parallel to each other.

It may be noted that the two arrangements is not limited to above mentioned positions. The angle between first strip 202a and second strip 202b may vary from 0 to 360 degrees depending on orientation of apertures 206 on the outer surface of inflator 108.

Figure 5:
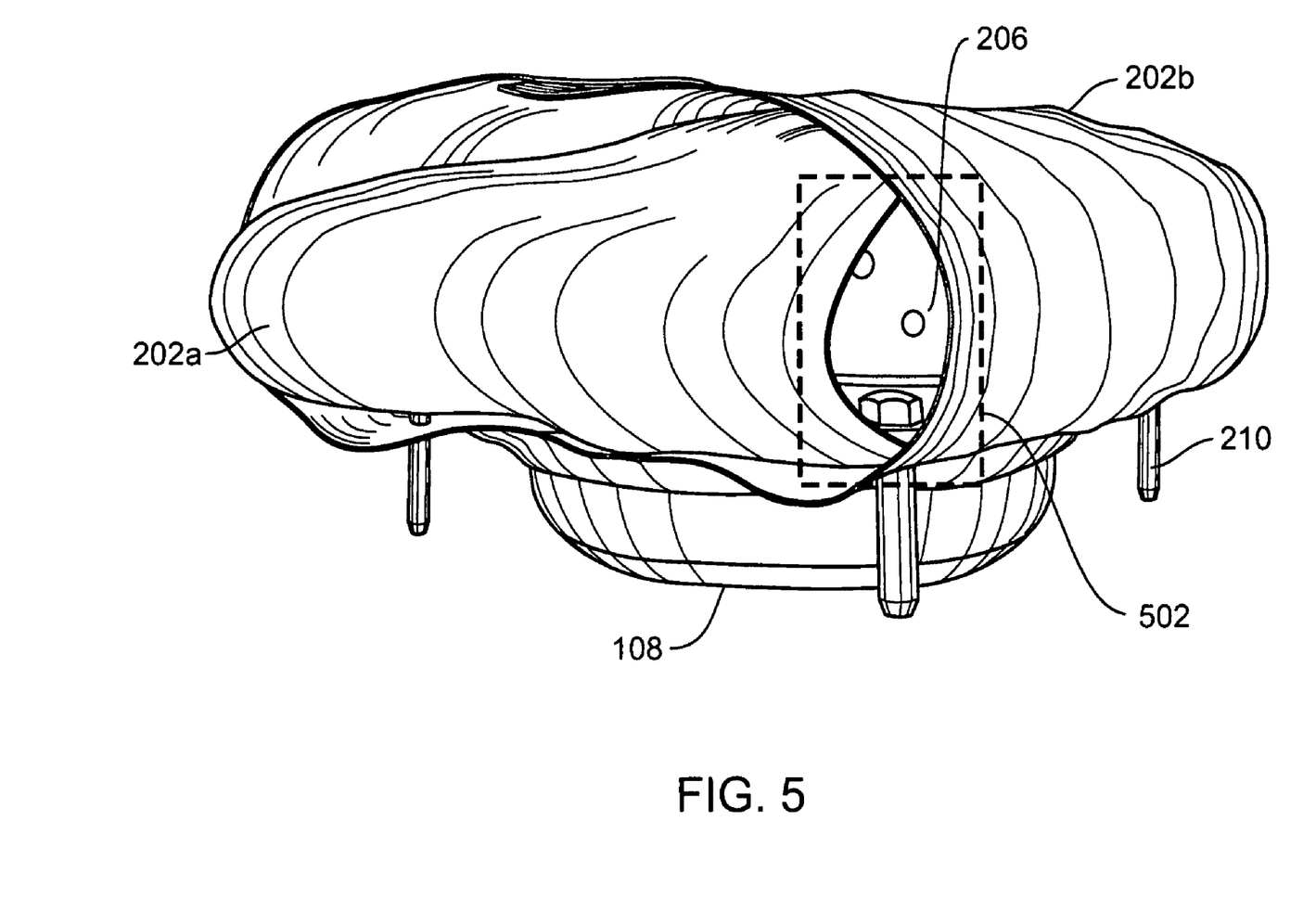
FIG. 5 shows a perspective view of the device with an inflator, in accordance with an embodiment of the invention.

FIG. 5 shows a perspective view of device 106 with inflator 108, in accordance with an embodiment of the invention.

First strip 202a is placed below second strip 202b. Further, first strip 202a is folded into an inner loop, while second strip 202b is folded into an outer loop. Studs 210 attach device 106 to inflator 108 and inflatable element 104 through holes 308 (not shown).

The inner loop and the outer loop are held by attachment means such as stitches. The inner loop may be held by a tack (single) stitch. Optionally, the inner loop may be held a secure stitch such as a double stitch or a triple stitch. Similarly, the outer loop may be held by either a tack stitch or a secure stitch. It may be obvious to a person skilled in the art that any suitable combination of stitches can be used for the inner loop and the outer loop.

On activation of inflator 108, the stitches are broken and the inner loop and the outer loop unfold to protect the cushion material of inflatable element 104. This functionality is explained in detail in conjunction with FIG. 7a and FIG. 7b.

The coating material applied on strips 202 protects inflatable element 104 from high temperatures of hot inflator gases. First strip 202a and second strip 202b avoid direct contact of the hot inflator gases with cushion material of inflatable element 104, thereby protecting inflatable element 104.

In an embodiment of the invention, the inner loop and the outer loop act like a diffuser and guide inflator gases into inflatable element 104. When the inner and outer loop are held in position, a plurality of openings 502 are created at all the four corners of device 106. Accordingly when device 106 acts like a diffuser, inflator gases flow into inflatable element 104 from openings 502. The size of the openings 502 controls the flow of inflator gases and guide inflator gases into inflatable element 104. Furthermore, device 106 protects inflatable element 104 from hot inflator gases, particulate matter and high temperatures. It may be noted that hot particulate matter present in the inflator 108 damages device 106 thereby protecting inflatable element 104.

Therefore, first strip 202a and second strip 202b protect inflatable element 104 from inflator gases when positioned in an unfolded state.

Figure 6:
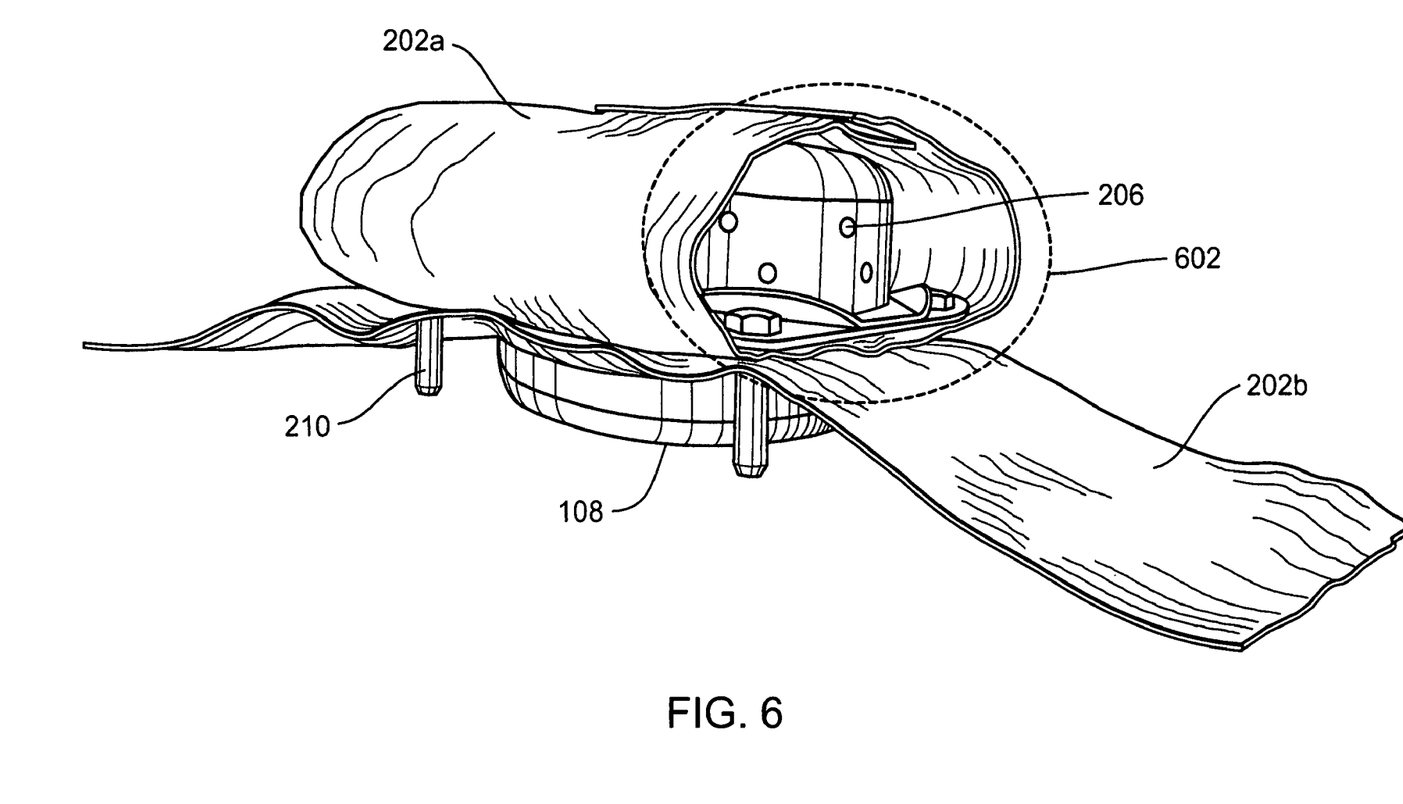
FIG. 6 shows a perspective view of the device with the inflator, in accordance with an embodiment of the invention.

FIG. 6 shows a perspective view of device 106 with inflator 108, in accordance with an alternative embodiment of the invention.

In this embodiment, only the inner loop is held securely by means of stitches (as explained with reference to FIG. 5). while the outer strip is left unstitched. Accordingly, when inflator gases flow into inflatable element 104, they are guided by a plurality of openings 602 that are created on either sides of inflator 108. Accordingly device 106 acts like a diffuser.

It may be obvious to a skilled person that the above embodiment of device 106 is also possible when inflator gases cause the outer loop to unfold when the outer loop is held by a tack stitch and the inner loop is held by a secure stitch.

Figure 7A:
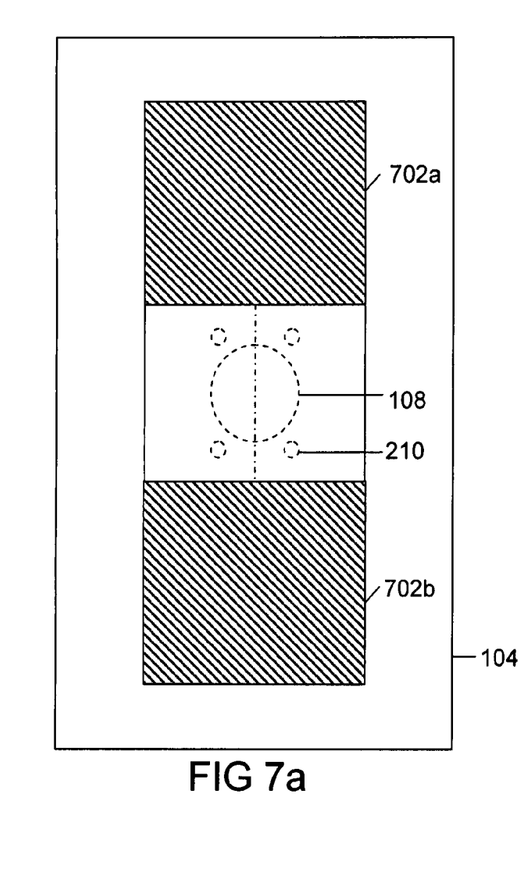
FIG. 7a shows a top view of the device, in accordance with an embodiment of the invention.

FIG. 7a shows a top view of device 106, in accordance with an embodiment of the invention. The embodiment illustrates the position of device 106 when the inner loop, created using first strip 202a, is held by a secure stitch and second strip 202b is left unstitched. Accordingly a first portion 702 is created including an area 702a and an area 702b. First portion 702 therefore shows the area that is protected in inflatable element 104 when device 106 is present in the aforementioned position.

Figure 7B:
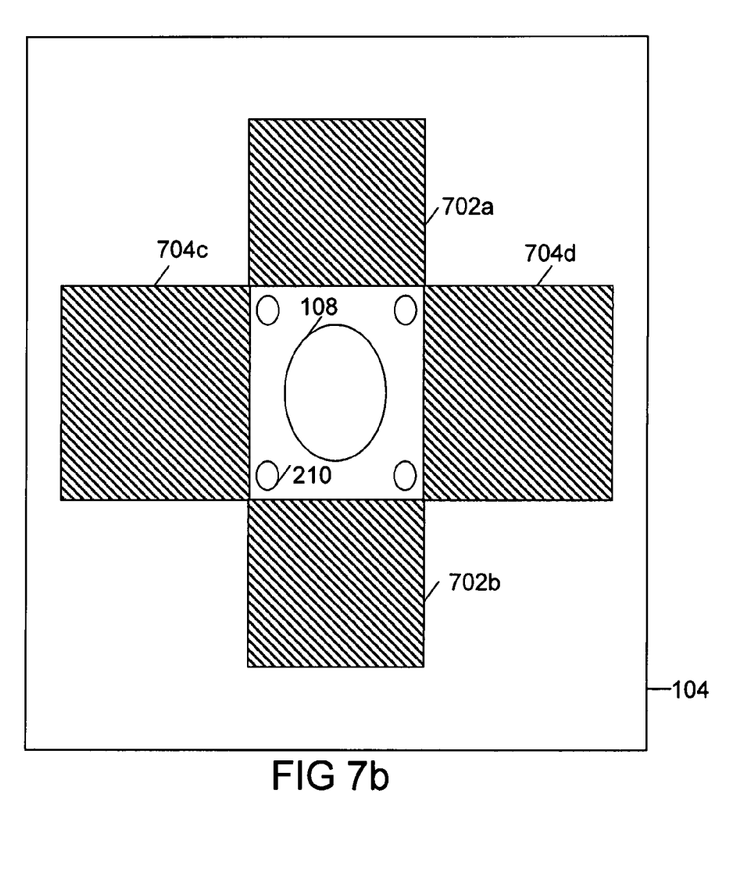
FIG. 7b shows a top view of the device, in accordance with an alternative embodiment of the invention.

FIG. 7b shows a top view of device 106, in accordance with an alternative embodiment of the invention. The embodiment illustrates the position of device 106 when first strip 202a and second strip 202b are in a perpendicular position with respect to each other. A second portion 704 is created including areas 702a, 702b and an area 702c and an area 702d. Second portion 704 therefore shows the area that is protected in inflatable element 104 when device 106 is present in the aforementioned position.

Various embodiments of the invention provide an advantageous device for protecting an inflatable element such as an airbag from hot inflator gases that are dispersed from an inflator, Further the device also acts as a diffuser depending on the arrangement of the strips in the device. Additionally, the device also reduces the forces exerted by the inflator gases and protects the inflatable element from particulate matter that may be contained in the inflator gases.

The device allows a reduction in injury values that are generally observed in Out-of-position (OOP) and low risk deployment (LRD) tests conducted by automobile researchers. Further, the device helps in reduction of overall costs for the manufacturing of airbag modules While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims

What is claimed is:

1. A device for protecting an inflatable element, the device comprising:
   a. a first strip, the first strip comprising at least one opening, the one opening being surrounded by a plurality of holes; and
   b. a second strip, the second strip comprising at least one opening, the one opening being surrounded by a plurality of holes, the second strip being placed at a predetermined angle to and above the first strip; and
   c. the first strip is folded into an inner loop and the inner loop is held together by one or more breakable attachments means, the second strip is folded into an outer loop and the outer loop is held together by one or more breakable attachment means, so that the breakable attachment means break and the inner loop and the outer loop unfold upon activation of the inflator.

2. The device according to claim 1, wherein the predetermined angle is such that the second strip is perpendicular to the first strip.

3. The device according to claim 1, wherein the second strip is placed parallel to the first strip.

4. The device according to claim 1, wherein an inflator is inserted in the first strip and the second strip through at least one opening in the first strip and at least one opening in the second strip.

5. The device according to claim 4, wherein the inflatable element, the inflator and the device are attached through an attachable means inserted through the plurality of holes in the first strip and the plurality of holes in the second strip.

6. The device according to claim 1, wherein the attachment means is one or more stitches.

7. The device according to claim 1, wherein the inner loop guides inflator gases from the inflator into the inflatable element.

8. The device according to claim 1, wherein the inner loop and the outer loop guide inflator gases from the inflator into the inflatable element.

9. The device according to claim 1, wherein the outer loop unfolds to protect a first portion of the inflatable element from inflator gases, the unfolding taking place once the inflator is activated.

10. The device according to claim 1, wherein the inner loop and the outer loop unfold to protect a second portion of the inflatable element from inflator gases, the unfolding taking place once the inflator is activated.

11. The device according to claim 1, wherein the first strip and the second strip are made of a heat resistant material.

12. An airbag module comprising:
   a. an airbag;
   b. an inflator, the inflator when activated inflating the airbag; and
   c. a device for protecting the airbag, the device comprising:
      i. a first strip, the first strip comprising at least one opening, the one opening being surrounded by a plurality of holes;
      ii. a second strip, the second strip comprising at least one opening, the one opening being surrounded by a plurality of holes, the second strip being placed perpendicular to and above the first strip; and
      iii. the first strip is folded into an inner loop and the inner loop is held together by one or more breakable attachment means, the second strip is folded into an outer loop and the outer loop is held together by one or more breakable attachment means, so that the breakable attachment means break and the inner loop and the outer loop unfold upon activation of the inflator.

13. The airbag module according to claim 12 further comprising a housing, wherein the airbag, the inflator and the device are inserted into the housing.

* * * * *

UNITED STATES PATENT AND TRADEMARK OFFICE
CERTIFICATE OF CORRECTION

| | | |
|---|---|---|
| PATENT NO. | : 7,748,739 B2 | Page 1 of 1 |
| APPLICATION NO. | : 11/475795 | |
| DATED | : July 6, 2010 | |
| INVENTOR(S) | : Kristy Brinker | |

It is certified that error appears in the above-identified patent and that said Letters Patent is hereby corrected as shown below:

In column 1, line 19, please replace "pertain airbag" with --certain airbag--

In column 5, claim 1, line 17, please replace "holes; and" with --holes--

Signed and Sealed this

Seventeenth Day of August, 2010

David J. Kappos
*Director of the United States Patent and Trademark Office*